United States Patent
Rasale et al.

(10) Patent No.: US 10,353,708 B2
(45) Date of Patent: Jul. 16, 2019

(54) STRIDED LOADING OF NON-SEQUENTIAL MEMORY LOCATIONS BY SKIPPING MEMORY LOCATIONS BETWEEN CONSECUTIVE LOADS

(71) Applicant: Advanced Micro Devices, Inc., Sunnyvale, CA (US)

(72) Inventors: Anupama Rajesh Rasale, Bangalore (IN); Dibyendu Das, Bangalore (IN); Ashutosh Nema, Bangalore (IN); Md Asghar Ahmad Shahid, Giridih (IN); Prathiba Kumar, Udumalpet (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 182 days.

(21) Appl. No.: 15/273,916

(22) Filed: Sep. 23, 2016

(65) Prior Publication Data
US 2018/0088948 A1   Mar. 29, 2018

(51) Int. Cl.
*G06F 9/30* (2018.01)
*G06F 15/80* (2006.01)
*G06F 9/345* (2018.01)

(52) U.S. Cl.
CPC ...... *G06F 9/30036* (2013.01); *G06F 9/30032* (2013.01); *G06F 9/30043* (2013.01);
(Continued)

(58) Field of Classification Search
CPC ............. G06F 9/30036; G06F 9/30043; G06F 9/30101; G06F 15/8007
See application file for complete search history.

(56) References Cited

U.S. PATENT DOCUMENTS 6,542,986 B1   4/2003   White
6,550,059 B1   4/2003   Choe et al.
(Continued)

OTHER PUBLICATIONS

Fog, Agner, "3. The microarchitecture of Intel, AMD and via CPUs: An optimization guide for assembly programmers and compiler makers", Agner.org, Apr. 27, 2018, 236 pages, https://www.agner.org/optimize/microarchitecture.pdf. [Retrieved Aug. 6, 2018].
(Continued)

*Primary Examiner* — Jyoti Mehta
(74) *Attorney, Agent, or Firm* — Meyertons Hood Kivlin Kowert and Goetzel PC; Rory D. Rankin

(57) ABSTRACT

Systems, apparatuses, and methods for utilizing efficient vectorization techniques for operands in non-sequential memory locations are disclosed. A system includes a vector processing unit (VPU) and one or more memory devices. In response to determining that a plurality of vector operands are stored in non-sequential memory locations, the VPU performs a plurality of vector load operations to load the plurality of vector operands into a plurality of vector registers. Next, the VPU performs a shuffle operation to consolidate the plurality of vector operands from the plurality of vector registers into a single vector register. Then, the VPU performs a vector operation on the vector operands stored in the single vector register. The VPU can also perform a vector store operation by permuting and storing a plurality of vector operands in appropriate locations within multiple vector registers and then storing the vector registers to locations in memory using a mask.

14 Claims, 13 Drawing Sheets

(52) U.S. Cl.
CPC ........ *G06F 9/3455* (2013.01); *G06F 15/8007* (2013.01); *G06F 15/8053* (2013.01)

(56) References Cited

U.S. PATENT DOCUMENTS

| | | | | |
|---|---|---|---|---|
| 7,197,625 | B1* | 3/2007 | van Hook | G06F 9/30032 |
| | | | | 710/50 |
| 7,464,255 | B1 | 12/2008 | Tan et al. | |
| 8,966,461 | B2 | 2/2015 | Gaster et al. | |
| 9,342,334 | B2 | 5/2016 | Beckmann et al. | |
| 9,600,288 | B1 | 3/2017 | Potter et al. | |
| 2004/0117595 | A1* | 6/2004 | Norris | G06F 9/30036 |
| | | | | 711/214 |
| 2005/0055543 | A1* | 3/2005 | Moyer | G06F 9/30014 |
| | | | | 712/225 |
| 2008/0022072 | A1 | 1/2008 | Jung et al. | |
| 2008/0133877 | A1* | 6/2008 | Chai | G06F 9/345 |
| | | | | 711/218 |
| 2012/0151156 | A1* | 6/2012 | Citron | G06F 9/30043 |
| | | | | 711/154 |
| 2015/0205324 | A1 | 7/2015 | Havlir et al. | |
| 2018/0089090 | A1 | 3/2018 | Havlir et al. | |
| 2018/0121386 | A1 | 5/2018 | Chen et al. | |

OTHER PUBLICATIONS

Fog, Agner, "4. Instruction tables: Lists of instruction latencies, throughputs and micro-operation breakdowns for Intel, AMD and via CPUs", Agner.org, Apr. 27, 2018, 352 pages, https://www.agner.org/optimize/instruction_tables.pdf. [Retrieved Aug. 6, 2018].

"Intel® 64 and IA-32 Architectures Software Developer's Manual", Intel.com, Sep. 2016, 2198 pages, vol. 2 (2A, 2B, 2C & 2D), https://www.intel.in/content/dam/www/public/us/en/documents/manuals/64-ia-32-architectures-software-developer-instruction-set-reference-manual-325383.pdf. [Retrieved Aug. 6, 2018].

Chen et al., U.S. Appl. No. 15/644,045, entitled "Stream Processor With High Bandwidth and Low Power Vector Register File", filed Jul. 7, 2017, 30 pages.

Monreal et al., "Late Allocation and Early Release of Physical Registers", IEEE Transactions on Computers, Oct. 2004, pp. 1244-1259, vol. 53, Issue 10.

Non-Final Office Action in U.S. Appl. No. 15/644,045, dated Sep. 28, 2018, 17 pages.

* cited by examiner

```
#GATHER operation:
vmovups (%rcx), %xmm10
vshufps $204,24(%rcx),%xmm10,%xmm4
vmovups (%rbx), %xmm11
vshufps $136,16(%rbx),%xmm11,%xmm11

#ARITHMETIC operation:
vmaxps  %xmm3, %xmm4, %xmm4
vaddps  %xmm11, %xmm4, %xmm4

#SCATTER operation:
vpermilps $100, %xmm4, %xmm10
vmaskmovps %xmm10, %xmm9, (%r15)
vpermilps $194, %xmm4, %xmm10
vmaskmovps %xmm10, %xmm9, 24(%r15)
```

FIG. 13

STRIDED LOADING OF NON-SEQUENTIAL MEMORY LOCATIONS BY SKIPPING MEMORY LOCATIONS BETWEEN CONSECUTIVE LOADS

BACKGROUND

Description of the Related Art

Many types of modern microprocessors support Single Instruction Multiple Data (SIMD) instructions. SIMD instructions enable microprocessors to exploit data level parallelism. Specifically, a SIMD instruction performs the same identical action simultaneously on two or more pieces of data. There are different ways to utilize the SIMD capabilities of a microprocessor. For example, a programmer can write SIMD assembly language instructions. Alternatively, a compiler can perform autovectorization. Autovectorization is a compiler transformation that automatically generates SIMD instructions for a program loop or a sequentially executing block of instructions. Vectorization of a program allows performance speedup of the application by leveraging the SIMD capabilities of modern microprocessors. However, efficient vectorization is severely inhibited in cases where the series of data elements to be operated upon are stored in non-sequential locations in memory.

BRIEF DESCRIPTION OF THE DRAWINGS

The advantages of the methods and mechanisms described herein may be better understood by referring to the following description in conjunction with the accompanying drawings, in which:

FIG. 13 illustrates one embodiment of an instruction sequence for performing vector operations.

DETAILED DESCRIPTION OF EMBODIMENTS

Figure 1:
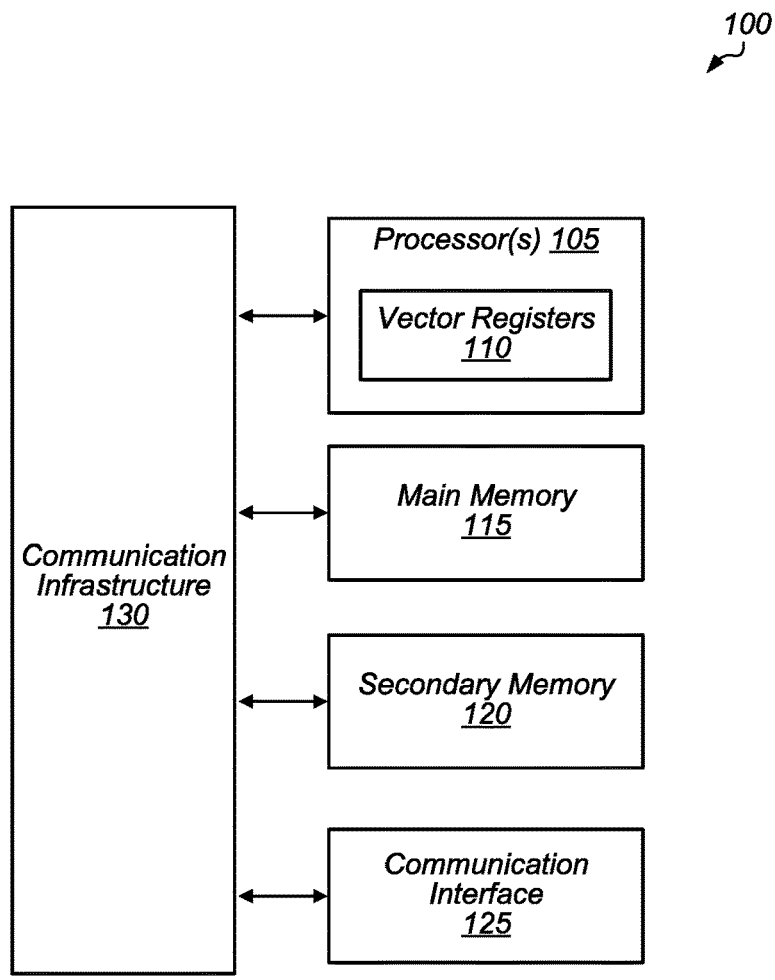
FIG. 1 is a block diagram of one embodiment of a computer system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for utilizing efficient vectorization techniques for operands in non-sequential memory locations are disclosed herein. In one embodiment, a system includes at least a vector processing unit and one or more memory devices. The vector processing unit includes a plurality of vector registers, with each vector register storing a plurality of elements. In one embodiment, the system determines that a plurality of vector operands are stored in non-sequential locations in memory. In response to determining that the plurality of vector operands are stored in non-sequential locations in memory, the vector processing unit performs a plurality of vector load operations to load the plurality of vector operands into a plurality of vector registers. Then, the vector processing unit performs a shuffle operation to consolidate the plurality of vector operands from the plurality of vector registers into a single vector register. Then, the vector processing unit can perform a vector operation utilizing the vector operands stored in the single vector register.

In one embodiment, the vector processing unit performs a first vector load operation to a first vector register from a first set of memory locations. One or more of the data elements loaded into the first vector register are not elements of interest and will be unused and/or discarded. The first set of memory locations are sequential locations in memory. The vector processing unit also performs a second vector load operation to a second vector register from a second set of memory locations. One or more of the data elements loaded into the second vector register are not elements of interest and will be unused and/or discarded. The second set of memory locations are sequential locations in memory. Then, the vector processing unit selects a first subset of elements in the first vector register and the vector processing unit selects a second subset of elements in the second vector register. Next, the first subset of elements and the second subset of elements are copied to appropriate locations within a third vector register. Then, the vector processing unit performs a vector operation on the vector operands stored in the third vector register.

In one embodiment, the system determines that a plurality of vector operands of a pending vector store operation are intended to be stored in non-sequential locations in memory. Accordingly, the vector processing unit permutes and stores the plurality of vector operands in appropriate locations within a plurality of vector registers. Next, the vector processing unit performs a plurality of vector store operations to store the plurality of vector registers to locations in memory using a mask to indicate which elements of the plurality of vector registers are not to be stored in corresponding locations in the memory.

In one embodiment, a vector processing unit detects a request to store a plurality of operands of a first vector register in non-sequential locations in memory. In response to detecting the request, the vector processing unit selects a first subset of operands from the first vector register. Next, the vector processing unit permutes and stores the first subset of operands in appropriate locations in a second vector register. Also, the vector processing unit selects a second subset of operands from the first vector register. The vector processing unit permutes and stores the second subset of operands in appropriate locations in a third vector register. Then, the vector processing unit performs vector store operations to memory for the second and third vector register using a mask to indicate which elements of the second and third vector registers are not to be stored in corresponding locations in the memory.

In one embodiment, a vector processing unit performs a first vector memory operation targeting a first set of memory locations. It can be assumed for the purposes of this discussion that the first vector memory operation is a store or load operation and that only a portion of the vector register elements being transferred or manipulated are operands of interest. It can also be assumed for the purposes of this discussion that the first set of memory locations are sequential locations in memory. Next, the vector processing unit calculates a skip factor based on a stride of the data elements stored in the array in memory and based on the size of (i.e., a number of elements in) the vector registers. Then, the vector processing unit skips over a number of memory locations equal to the skip factor after performing the first vector memory operation and before performing a subsequent vector memory operation. After skipping over the number of memory locations equal to the previously calculated skip factor, the vector processing unit performs a second vector memory operation to a second set of memory locations. It can be assumed for the purposes of this discussion that the second set of memory locations are sequential locations in memory. Also, there is a gap between the first set of memory locations and the second set of memory locations, with the size of the gap equal to the previously calculated skip factor.

Referring now to FIG. 1, a block diagram of one embodiment of a computer system 100 is shown. Computer system 100 includes processor(s) 105, which is representative of any number and type of processors. Processor(s) 105 also include vector registers 110, which are representative of any number and size of vector registers. Processor(s) 105 are connected to a communication infrastructure 130 which is representative of any type or combination of bus, fabric, and/or network. In one embodiment, processor(s) 105 can execute the main control software of system 100, such as an operating system. Generally, software executed by processor(s) 105 during use can control the other components of system 100 to realize the desired functionality of system 100. Processor(s) 105 can also execute other software, such as application programs. The application programs can provide user functionality, and may rely on the operating system for lower level device control Computer system 100 also includes main memory 115 (e.g., random access memory (RAM), dynamic RAM (DRAM)), and secondary memory 120 (e.g., hard disk drive, solid state drive). Computer system 100 also includes a communication interface 125 to allow computer system 100 to communicate with external devices. Examples of communication interface 125 include a modem, a network interface (such as an Ethernet card), a communications port, a universal serial bus (USB) port, etc.

As used herein, the terms "computer readable storage medium" and "non-transitory computer readable storage medium" are used to generally refer to main memory 115 and secondary memory 120. Computer programs can be stored in main memory 115 and/or secondary memory 120. Computer programs can be received via communications interface 125 or from secondary memory 120. Such computer programs, when executed, enable the computer system 100 to implement the methods and mechanisms discussed herein. Where the methods and mechanisms are implemented using software, the software can be stored in a computer program product and loaded into computer system 100 using communications interface 125 or another interface and stored in main memory 115 and/or secondary memory 120. In other embodiments, other computer systems with other components and/or other types of computer architectures can be utilized with the methods and mechanisms described herein.

Computer system 100 can correspond to any of various types of computer systems or computing devices, including, but not limited to, a personal computer system, desktop computer, laptop or notebook computer, supercomputer, tablet, phone, smartphone, mainframe computer system, handheld computer, workstation, network computer, a consumer device, server, file server, application server, storage server, or in general any type of computing system or device.

Figure 2:
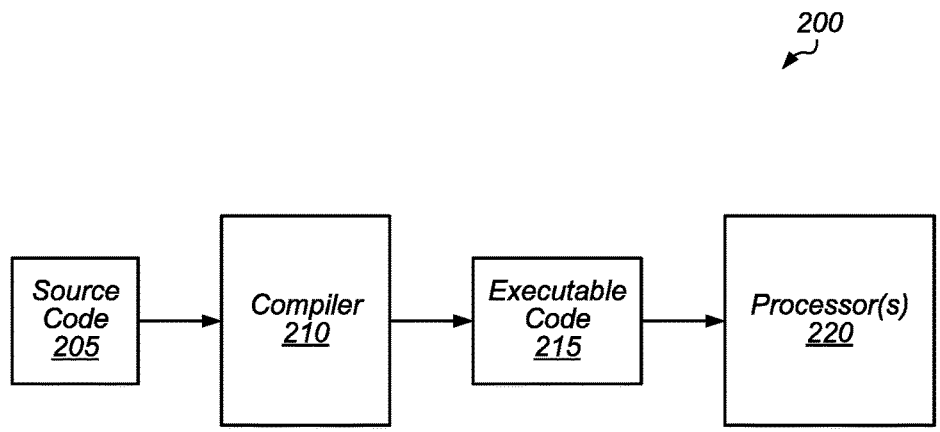
FIG. 2 is a block diagram of one embodiment of a computing environment.

Turning now to FIG. 2, a block diagram of one embodiment of a computing environment 200 is shown. Computing environment 200 includes a compiler 210 and one or more processors 220. In one embodiment, compiler 210 is a low level virtual machine (LLVM) compiler. In other embodiments, compiler 210 can be other types of compilers. Compiler 210 is configured to compile source code 205 into executable code 215. In one embodiment, executable code 215 is an executable binary which can be executed by processor(s) 220. In one embodiment, processor(s) 220 can include one or more single instruction multiple data (SIMD) units for operating on data in parallel. Compiler 210 is configured to optimize executable code 215 to take advantage of the SIMD units. For example, compiler 210 can perform vectorization of program loops detected in source code 205 and generate executable instructions in executable code 215 that utilize the SIMD units of processor(s) 220.

In one embodiment, when analyzing source code 205, compiler 210 can determine that a plurality of vector operands are stored in non-sequential locations in memory. In response to determining that the plurality of vector operands are stored in non-sequential locations in memory, compiler 210 generates a plurality of vector load operations in executable code 215 to load the plurality of vector operands into a plurality of vector registers. Then, compiler 210 generates a shuffle operation in executable code 215 to consolidate the plurality of vector operands from the plurality of vector registers into a single vector register. Then, compiler 210 can generate a vector operation in executable code 215 utilizing the vector operands stored in the single vector register. In other embodiments, compiler 210 can also generate other operations to optimize executable code 215 for running on one or more SIMD units when performing vector memory operations to non-sequential locations in memory.

Figure 3:
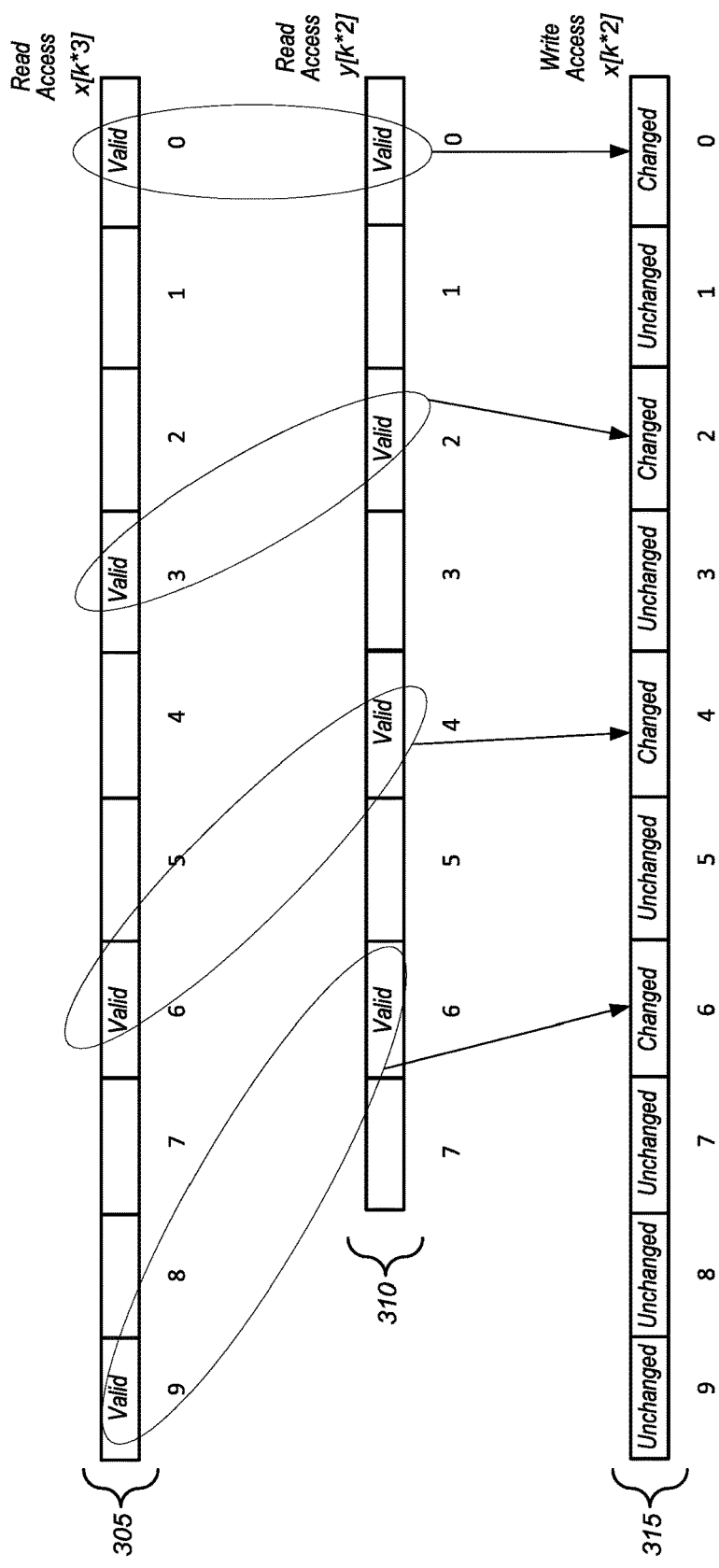
FIG. 3 includes block diagrams of one embodiment of strided access schemes.

Referring now to FIG. 3, block diagrams of one embodiment of strided access schemes are shown. The top diagram 305 shows a strided read access pattern with a stride of 3. For example, a program can access an array of elements 'x' with a stride of 3. So for the array of elements 'x', two consecutive elements of interest are spaced apart by 3 indices. For example, elements 0, 3, 6, and 9 are shown to have valid data elements. Given k=0, 1, 2, 3; [k*3] may be used to address elements 0, 3, 6, and 9 of x[]. Of course, other ways of addressing strided elements are possible and are contemplated.

The middle diagram 310 shows a strided read access pattern with a stride of 2. For example, a program can access another array of elements 'y' with a stride of 2. In one embodiment, arithmetic operations can be performed between the 'x' and 'y' arrays with elements accessed at strides of 3 and 2, respectively. In one embodiment, the results of the operations can be written back to array 'x' with a stride of 2, as shown in the bottom diagram 315. These diagrams are illustrative of strided access pattern examples in accordance with various embodiments. It is noted that in other embodiments, other strided access patterns can be utilized with other strides.

Figure 4:
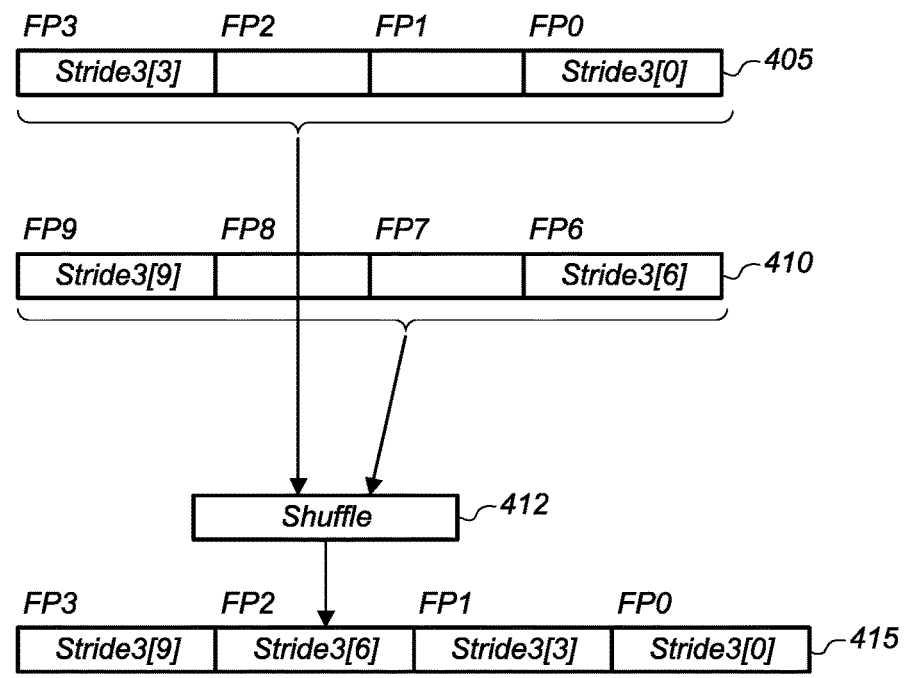
FIG. 4 is a block diagram of one embodiment of performing a vector load operation for operands stored in non-sequential memory locations.

Turning now to FIG. 4, a block diagram of one embodiment of performing a vector load operation for operands stored in non-sequential memory locations is shown. The example of a vector load operation shown in FIG. 4 is of a load operation targeting data elements stored in memory with a stride of 3. In other embodiments, other data elements stored in memory with other strides can be loaded in a similar manner as shown in FIG. 4.

As shown, first vector register 405 is loaded with four contiguous elements from memory, with only two of these elements actually elements of interest. The elements of interest are stored in the floating point 0 (FP0) and FP3 element locations of vector register 405. It is noted that in one embodiment, vector register 405 can store values in floating point representation. In other embodiments, vector register 405 can store values in other representations.

Additionally, vector register 410 is loaded from four sequential memory locations, with only two of these elements actually elements of interest. It is noted that two locations from memory, corresponding to FP4 and FP5, are skipped over after loading vector register 405 and before loading second vector register 410 from memory. Then, a shuffle operation 412 is performed on first vector register 405 and second vector register 410 to copy the valid elements of interest from first vector register 405 and second vector register 410 to third vector register 415. As shown, all four elements of third vector register 415 are filled with valid operands from first vector register 405 and second vector register 410.

When loading consecutive vector registers from the array with a stride of 3 stored in memory, two memory locations are skipped over in memory in between consecutive loads. In one embodiment, the number of locations to skip over can be determined by calculating a skip factor based on the stride and the vector factor (VF). As used herein, the term "stride" is defined as the number of locations between consecutive array elements. The VF refers to the size of a vector register in terms of a number of data elements. The skip factor specifies the number of memory locations to skip over in between performing consecutive vector load operations. In one embodiment, the skip factor can be calculated according to the following formula:

SkipFactor=(Stride−(VF % Stride)) % Stride

In the above formula, the "%" symbol refers to the modulo operation. The modulo operation calculates the remainder after division of the first indicated number by the second indicated number. For example, in the example shown in FIG. 4, with a stride of 3 and a VF of 4, the skip factor is calculated as 2 according to the above formula. It should be understood that the example of vector registers 405, 410, and 415 having four elements (i.e., VF=4) is merely illustrative of one possible embodiment. In other embodiments, vector registers can include other numbers of elements.

Figure 5:
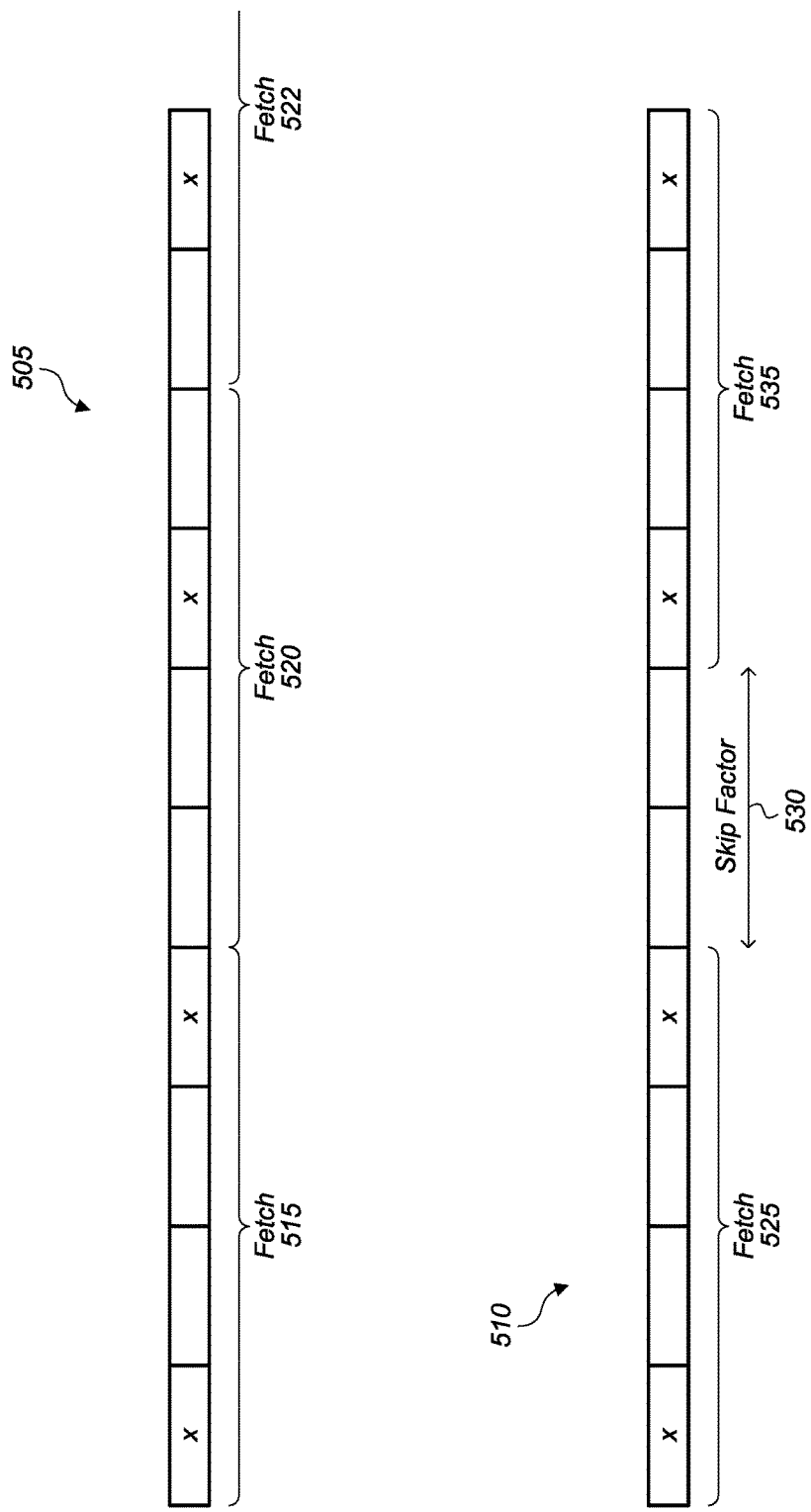
FIG. 5 includes diagrams comparing a regular load sequence and an optimized load sequence.

Referring now to FIG. 5, diagrams comparing a regular load sequence 505 and an optimized load sequence 510 are shown. The examples of regular load sequence 505 and an optimized load sequence 510 are shown for a stride of 3 and a vector factor (VF) of 4. In other embodiments, other strides and other VFs can be utilized. Each element of interest in regular load sequence 505 and optimized load sequence 510 is indicated with an "x" in the box. The boxes without an "x" are representative of elements that are not of interest for the vector operation.

As shown for regular load sequence 505, a traditional load sequence would perform fetches to memory with no gap between the consecutive fetches. Accordingly, when performing a first fetch 515 of four elements from memory, a second fetch 520 of four elements from memory is performed with the first element fetched being adjacent to the last element fetched during the first fetch 515. This pattern of fetches can continue for subsequent fetches (e.g., fetch 522) from memory.

As shown for optimized load sequence 510, after the first fetch 525 from memory, the next two memory locations can be skipped over according to a calculated skip factor 530. Then, the second fetch 535 from memory can begin two memory locations away from the last location fetched by fetch 525. This pattern of fetches can continue for subsequent fetches from memory. By utilizing a skip factor between memory fetches, more valid operands can be loaded into vector registers for the same number of memory accesses.

Figure 6:
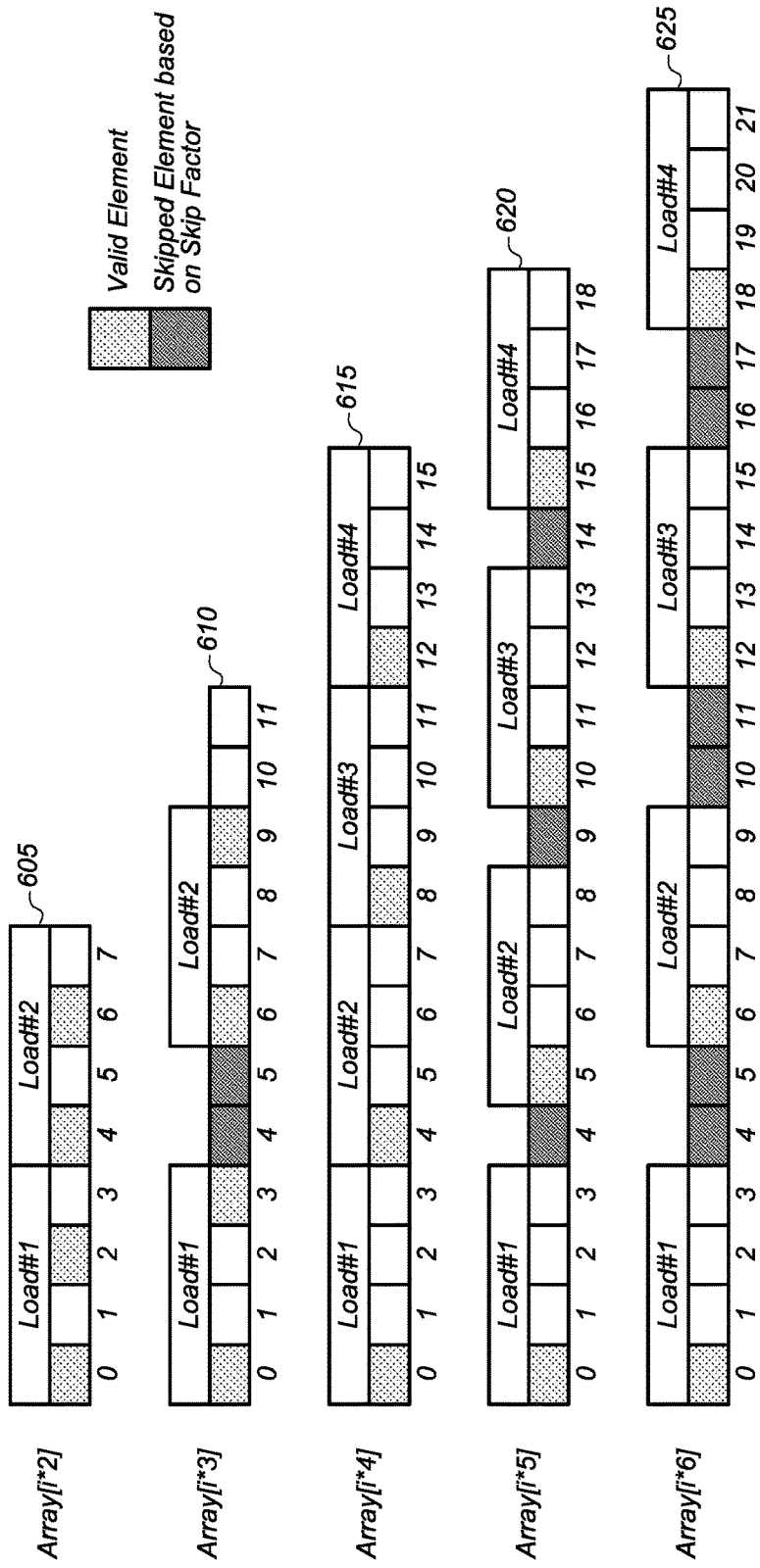
FIG. 6 includes diagrams of various skip factors for different strides.

Turning now to FIG. 6, diagrams of various skip factors for different strides are shown. The examples of different skip factors for strides are based on a VF of 4. In other embodiments, other VF's can be utilized and the skip factor can be calculated according to the previously described formula. As shown at the top of FIG. 6, diagram 605 shows an access pattern for an array with a stride of 2. For an access pattern with a stride of 2, there is no skip factor (i.e., skip factor=0). This is shown as a first vector load operation (i.e., load #1) accessing memory locations 0-3 and load #2 accessing locations 4-7, with no gap between load #1 and load #2. Diagram 610 shows an access pattern for an array with a stride of 3. For an access pattern with a stride of 3, there is a skip factor of 2. This is illustrated with load #1 accessing locations 0-3 and load #2 accessing locations 6-9, with locations 4 and 5 skipped over.

Diagram 615 shows an access pattern for an array with a stride of 4. For an access pattern with a stride of 4, there is no skip factor (i.e., skip factor=0). This is shown as load #1 accessing locations 0-3 and load #2 accessing locations 4-7, with no gap between load #1 and load #2. Load #3 and load #4 continue with the same access pattern. Diagram 620 shows an access pattern for an array with a stride of 5. For an access pattern with a stride of 5, there is a skip factor of 1. This is shown as load #1 accessing locations 0-3 and load #2 accessing locations 5-8, with location 4 skipped over. This pattern of using a skip factor of 1 is continued for additional memory accesses (load #3 and load #4). Diagram 625 shows an access pattern for an array with a stride of 6. For an access pattern with a stride of 6, there is a skip factor of 2. This is shown as load #1 accessing locations 0-3 and load #2 accessing locations 6-9, with locations 4 and 5 skipped over. This pattern of using a skip factor of 2 is continued for additional memory accesses (load #3 and load #4).

Figure 7:
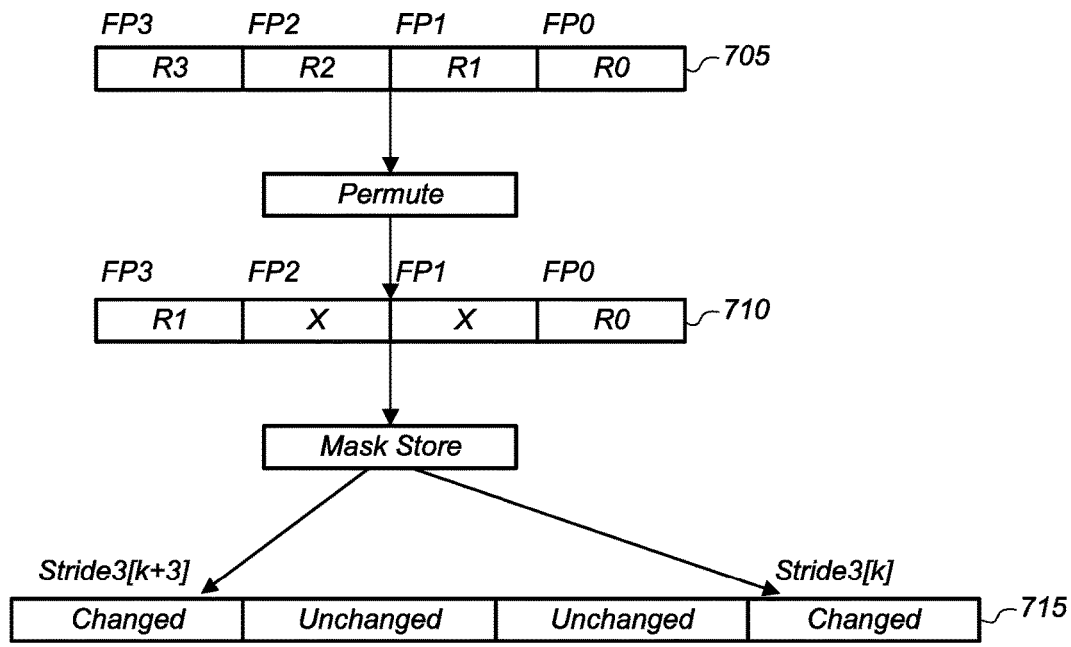
FIG. 7 is a block diagram of one embodiment of performing a scatter operation to store data in non-sequential locations in memory.

Referring now to FIG. 7, a block diagram of one embodiment of performing a scatter operation to store data in non-sequential locations in memory is shown. After an arithmetic operation is performed on vector operands, the resultant data can be stored back to memory. In one embodiment, to mimic the placement of the final results in memory, a vector permute operation is used to place the results of the arithmetic operation in one or more vector registers. This will cause the individual result data elements to be spaced away from each other as required by the stride. The other vector register elements are undefined and not of interest.

Next, the computed result data elements are stored back to memory. In one embodiment, a VMASKMOV instruction is used to store only the computed result data elements back to memory. The VMASKMOV instruction can selectively store elements into memory as a vector with masked elements leaving gaps in the corresponding memory locations. A mask is generated such that the computed elements get updated to the array in memory. The other elements of the array which should not be affected remain unchanged in memory.

For example, as shown in FIG. 7, vector register 705 contains four elements which are represented by R3, R2, R1, and R0. It can be assumed for the purposes of this embodiment that the stride for the store operation is 3, which requires each of the valid elements to be spaced apart by 3 elements with the intervening elements not to be disturbed. As shown in FIG. 7, a vector permute operation is performed to shift elements R1 and R0 of vector register 705 into locations 3 and 0 of vector register 710. No data of interest is stored in locations 2 and 1 of vector register 710. In one embodiment, the VPERM instruction is executed to perform the vector permute operation. Then, a mask store operation is used to store the elements of interest of vector register 710 to the appropriate locations in memory 715 with a stride of 3 between the stored elements. Although not shown in FIG. 7, similar operations can be performed on elements R3 and R2 of vector register 705 to write these elements to the appropriate locations in memory.

Figure 8:
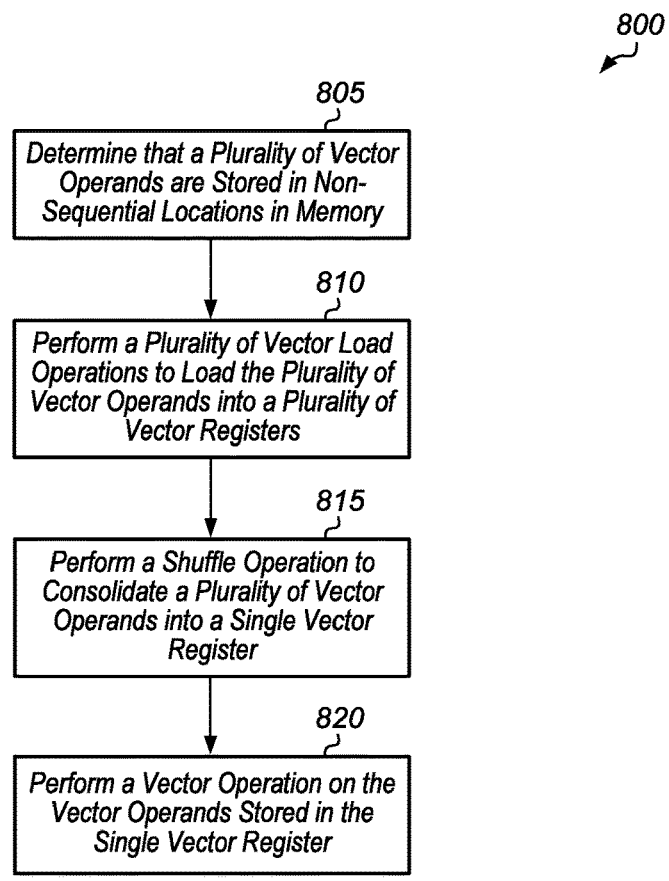
FIG. 8 is a generalized flow diagram illustrating one embodiment of a method for processing vector operands stored in non-sequential locations in memory.

Turning now to FIG. 8, one embodiment of a method 800 for processing vector operands stored in non-sequential locations in memory is shown. For purposes of discussion, the steps in this embodiment and those of FIGS. 9-12 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 800.

A system determines that a plurality of vector operands are stored in non-sequential locations in memory (block 805). In one embodiment, the system includes at least a vector processing unit and one or more memory devices. The vector processing unit includes a plurality of vector registers, with each vector register storing a plurality of elements. In one embodiment, the non-sequential locations in the memory storing the first plurality of vector operands are spaced apart by a given stride.

Next, in response to determining that the plurality of vector operands are stored in non-sequential locations in memory, the vector processing unit performs a plurality of vector load operations to load the plurality of vector operands into a plurality of vector registers (block 810). Then, the vector processing unit performs a shuffle operation to consolidate a plurality of vector operands into a single vector register (block 815). Next, the vector processing unit performs a vector operation on the vector operands stored in the single vector register (block 820). The vector operation can also be performed on vector operands stored in other vector registers, depending on the embodiment. After block 820, method 800 ends.

Figure 9:
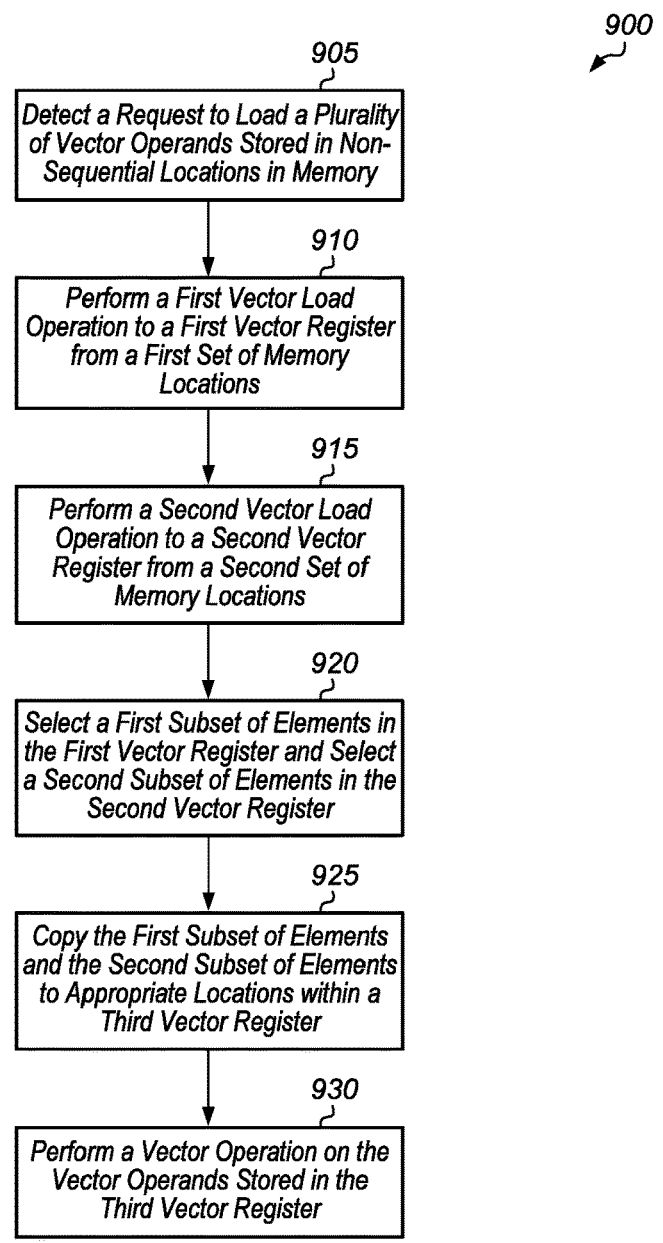
FIG. 9 is a generalized flow diagram illustrating one embodiment of a method for performing a vector load operation.

Referring now to FIG. 9, one embodiment of a method 900 for performing a vector load operation is shown. In the example shown, a vector processing unit detects a request to load a plurality of vector operands stored in non-sequential locations in memory (block 905). In response to detecting the request, the vector processing unit performs a first vector load operation to a first vector register from a first set of memory locations (block 910). One or more of the data elements loaded into the first vector register are not elements of interest and will be unused and/or discarded. The first set of memory locations are sequential locations in memory. The vector processing unit also performs a second vector load operation to a second vector register from a second set of memory locations (block 915). One or more of the data elements loaded into the second vector register are not elements of interest and will be unused and/or discarded. The second set of memory locations are sequential locations in memory. In some embodiments, the vector processing unit can perform additional vector load operations to additional vector registers. Accordingly, it should be understood that while two vector load operations are described as being performed in method 900, more than two vector load operations can be performed in other embodiments. Similarly, in the discussion regarding methods 1100 and 1200 (of FIG. 11 and FIG. 12, respectively), while two vector operations are described as being performed, additional vector operations can also be performed while still using the optimization techniques described herein.

Next, the vector processing unit selects a first subset of elements in the first vector register and the vector processing unit selects a second subset of elements in the second vector register (block 920). The selected elements are elements which are targeted by a subsequent vector operation. Then, the first subset of elements and the second subset of elements are copied to appropriate locations within a third vector register (block 925). Next, the vector processing unit performs a vector operation on the vector operands stored in the third vector register (block 930). The vector operation can also be performed on vector operands stored in other vector registers, depending on the embodiment. After block 930, method 900 ends.

Figure 10:
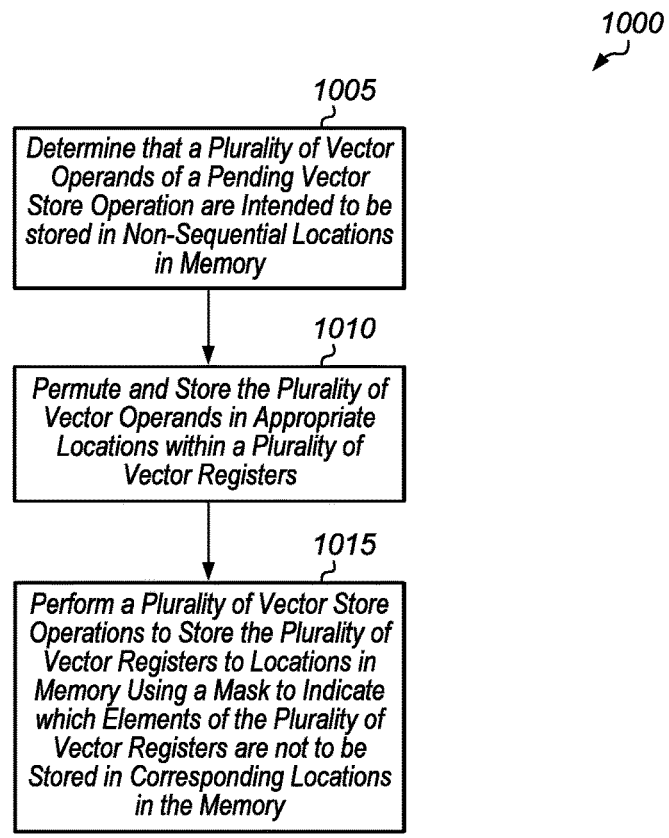
FIG. 10 is a generalized flow diagram illustrating one embodiment of a method for performing a vector store operation.

Turning now to FIG. 10, one embodiment of a method 1000 for performing a vector store operation is shown. In the example shown, a system determines that a plurality of vector operands of a pending vector store operation are intended to be stored in non-sequential locations in memory (block 1005). In one embodiment, the system includes at least a vector processing unit and one or more memory devices. The vector processing unit includes a plurality of vector registers, with each vector register storing a plurality of elements. In one embodiment, the non-sequential locations in the memory storing the first plurality of vector operands are spaced apart by a given stride.

Next, the vector processing unit permutes and stores the plurality of vector operands in appropriate locations within a plurality of vector registers (block 1010). Then, the vector processing unit performs a plurality of vector store operations to store the plurality of vector registers to locations in memory using a mask to indicate which elements of the plurality of vector registers are not to be stored in corresponding locations in the memory (block 1015). After block 1015, method 1000 ends.

Figure 11:
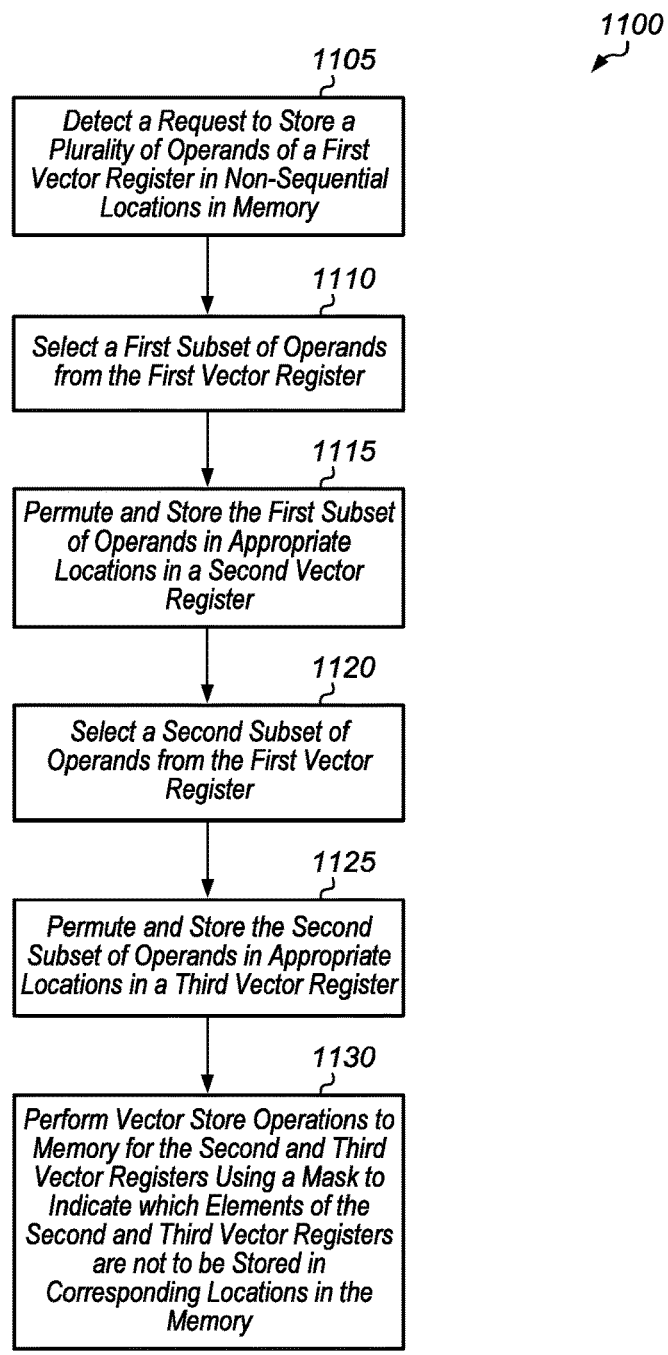
FIG. 11 is a generalized flow diagram illustrating another embodiment of a method for performing a vector store operation.

Referring now to FIG. 11, another embodiment of a method 1100 for performing a vector store operation is shown. In the example shown, a vector processing unit detects a request to store a plurality of operands of a first vector register in non-sequential locations in memory (block 1105). In response to detecting the request, the vector processing unit selects a first subset of operands from the first vector register (block 1110). The vector processing unit permutes and stores the first subset of operands in appropriate locations in a second vector register (block 1115). Next, the vector processing unit selects a second subset of operands from the first vector register (block 1120). The vector processing unit permutes and stores the second subset of operands in appropriate locations in a third vector register (block 1125). Then, the vector processing unit performs vector store operations to memory for the second and third vector registers using a mask to indicate which elements of the second and third vector registers are not to be stored in corresponding locations in the memory (block 1130). In some embodiments, the vector processing unit can perform additional vector store operations for additional vector registers. After block 1130, method 1100 ends.

Figure 12:
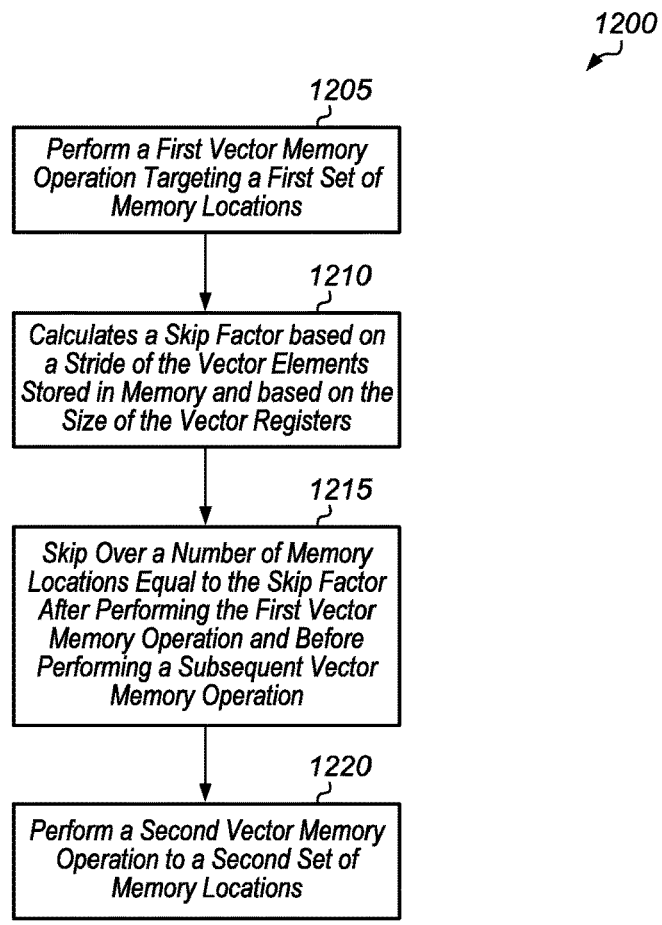
FIG. 12 is a generalized flow diagram illustrating one embodiment of a method for performing a vector memory operation.

Turning now to FIG. 12, one embodiment of a method 1200 for performing a vector memory operation is shown. In the example shown, a vector processing unit performs a first vector memory operation targeting a first set of memory locations (block 1205). It can be assumed for the purposes of this discussion that the first vector memory operation is a store or load operation and only a portion of the elements being transferred are operands of interest. It can also be assumed for the purposes of this discussion that the first set of memory locations are sequential locations in memory. Next, the vector processing unit calculates a skip factor based on a stride of the vector elements stored in memory and based on the size of (i.e., a number of elements in) the vector registers (block 1210).

Then, the vector processing unit skips over a number of memory locations equal to the skip factor after performing the first vector memory operation and before performing a subsequent vector memory operation (block 1215). After skipping over the number of memory locations equal to the previously calculated skip factor, the vector processing unit performs a second vector memory operation to a second set of memory locations (block 1220). It can be assumed for the purposes of this discussion that the second set of memory locations are sequential locations in memory. Also, there is a gap between the first set of memory locations and the second set of memory locations, with the size of the gap equal to the previously calculated skip factor. In other words, the second set of memory locations are not directly adjacent to the first set of memory locations. In some cases, the skip factor that is calculated in block 1210 can be equal to zero, depending on the value of the stride and the size of the vector registers. In these cases, blocks 1215 and 1220 can be skipped. After block 1220, method 1200 ends. Alternatively, after block 1220, the vector processing unit can perform additional vector memory operations.

Referring now to FIG. 13, one embodiment of an instruction sequence 1300 for performing vector operations is shown. Instruction sequence 1300 illustrates one example of code for performing vector operations as previously described. Instruction sequence 1300 includes gather operation section 1305, arithmetic operation section 1310, and scatter operation section 1315. In other embodiments, instruction sequence 1300 can include additional sections, other arrangements of operations, and/or other types of instructions.

Gather operation section 1305 loads operands into vector registers and then shuffles the operands into the appropriate locations within the vector registers. The skip factor for the array is calculated based on the value of the stride and the size of the vector registers, and the skip factor is utilized by the vshufps instructions in gather operation section 1305 to efficiently load the operands into vector registers. Arithmetic operation section 1310 is one example of arithmetic operations that can be performed on the consolidated vector registers. Scatter operation section 1315 permutes and uses masks to store the results of the arithmetic operations to strided locations within memory. The skip factor for the array is also utilized by the vmaskmovps instructions in scatter operation section 1315.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a vector processing unit comprising a plurality of vector registers and
a memory;
wherein the vector processing unit is configured to:
perform a plurality of vector load operations to load a first plurality of vector operands into a first plurality of vector registers, wherein the first plurality of vector operands are stored in non-sequential locations in the memory;
perform a shuffle operation to consolidate the first plurality of vector operands stored in the first plurality of vector registers into a single vector register;
calculate a skip factor based on a stride of vector operands stored in the memory and based on a number of elements in each vector register of the first plurality of vector registers;
skip over a number of memory locations equal to the skip factor in between performing consecutive load operations; and
perform a vector operation on the first plurality of vector operands stored in the single vector register.

2. The system as recited in claim 1, wherein the non-sequential locations in the memory storing the first plurality of vector operands are spaced apart by a given stride.

3. The system as recited in claim 1, wherein performing a plurality of vector load operations to load the first plurality of vector operands into a first plurality of vector registers comprises:

performing a first vector load operation to a first vector register from a first set of memory locations, wherein one or more data elements loaded into the first vector register will be unused; and
performing a second vector load operation to a second vector register from a second set of memory locations, wherein one or more data elements loaded into the second vector register will be unused.

4. The system as recited in claim 3, wherein performing a shuffle operation to consolidate the first plurality of vector operands stored in the first plurality of vector registers into the single vector register comprises:
selecting a first subset of elements in the first vector register and selecting a second subset of elements in the second vector register; and
copying the first subset of elements from the first vector register and the second subset of elements from the second vector register to appropriate locations within the single vector register.

5. The system as recited in claim 1, wherein the vector processing unit is further configured to:
determine that a second plurality of vector operands of a pending vector store operation are intended to be stored in non-sequential locations in the memory;
permute and store the second plurality of vector operands in appropriate locations within a second plurality of vector registers; and
performing a plurality of vector store operations to store the second plurality of vector registers to locations in memory using a mask to indicate which elements of the second plurality of vector registers are not to be stored in corresponding locations in the memory.

6. A method performed by a vector processing unit comprising a plurality of vector registers, the method comprising:
performing a plurality of vector load operations to load a first plurality of vector operands into a first plurality of vector registers, wherein the first plurality of vector operands are stored in non-sequential locations in memory;
performing a shuffle operation to consolidate the first plurality of vector operands stored in the first plurality of vector registers into a single vector register;
calculating a skip factor based on a stride of vector operands stored in the memory and based on a number of elements in each vector register of the first plurality of vector registers;
skipping over a number of memory locations equal to the skip factor in between performing consecutive load operations; and
performing a vector operation on the first plurality of vector operands stored in the single vector register.

7. The method as recited in claim 6, wherein the non-sequential locations in the memory storing the first plurality of vector operands are spaced apart by a given stride.

8. The method as recited in claim 6, wherein performing a plurality of vector load operations to load the first plurality of vector operands into a first plurality of vector registers comprises:
performing a first vector load operation to a first vector register from a first set of memory locations, wherein one or more data elements loaded into the first vector register will be unused; and
performing a second vector load operation to a second vector register from a second set of memory locations, wherein one or more data elements loaded into the second vector register will be unused.

9. The method as recited in claim 8, wherein performing a shuffle operation to consolidate the first plurality of vector operands stored in the first plurality of vector registers into the single vector register comprises:
selecting a first subset of elements in the first vector register and selecting a second subset of elements in the second vector register; and
copying the first subset of elements from the first vector register and the second subset of elements from the second vector register to appropriate locations within the single vector register.

10. The method as recited in claim 6, further comprising:
determining that a second plurality of vector operands of a pending vector store operation are intended to be stored in non-sequential locations in the memory;
permuting and storing the second plurality of vector operands in appropriate locations within a second plurality of vector registers; and
performing a plurality of vector store operations to store the second plurality of vector registers to locations in memory using a mask to indicate which elements of the second plurality of vector registers are not to be stored in corresponding locations in the memory.

11. A non-transitory computer readable storage medium storing program instructions, wherein the program instructions are executable by a processor to:
perform a plurality of vector load operations to load a first plurality of vector operands into a first plurality of vector registers, wherein the first plurality of vector operands are stored in non-sequential locations in memory;
perform a shuffle operation to consolidate the first plurality of vector operands stored in the first plurality of vector registers into a single vector register;
calculate a skip factor based on a stride of vector operands stored in the memory and based on a number of elements in each vector register of the first plurality of vector registers;
skip over a number of memory locations equal to the skip factor in between performing consecutive vector load operations; and
perform a vector operation on the first plurality of vector operands stored in the single vector register.

12. The non-transitory computer readable storage medium as recited in claim 11, wherein the non-sequential locations in the memory storing the first plurality of vector operands are spaced apart by a given stride.

13. The non-transitory computer readable storage medium as recited in claim 11, wherein performing a plurality of vector load operations to load the first plurality of vector operands into a first plurality of vector registers comprises:
performing a first vector load operation to a first vector register from a first set of memory locations, wherein one or more data elements loaded into the first vector register will be unused; and
performing a second vector load operation to a second vector register from a second set of memory locations, wherein one or more data elements loaded into the second vector register will be unused.

14. The non-transitory computer readable storage medium as recited in claim 13, wherein performing a shuffle operation to consolidate the first plurality of vector operands stored in the first plurality of vector registers into a single vector register comprises:
selecting a first subset of elements in the first vector register and selecting a second subset of elements in the second vector register; and copying the first subset of elements from the first vector register and the second subset of elements from the second vector register to appropriate locations within the single vector register.

\* \* \* \* \*